J. H. KNAGGS.
ENDLESS RUNNER WHEEL.
APPLICATION FILED OCT. 20, 1919.
1,367,820.
Patented Feb. 8, 1921.
2 SHEETS—SHEET 1.
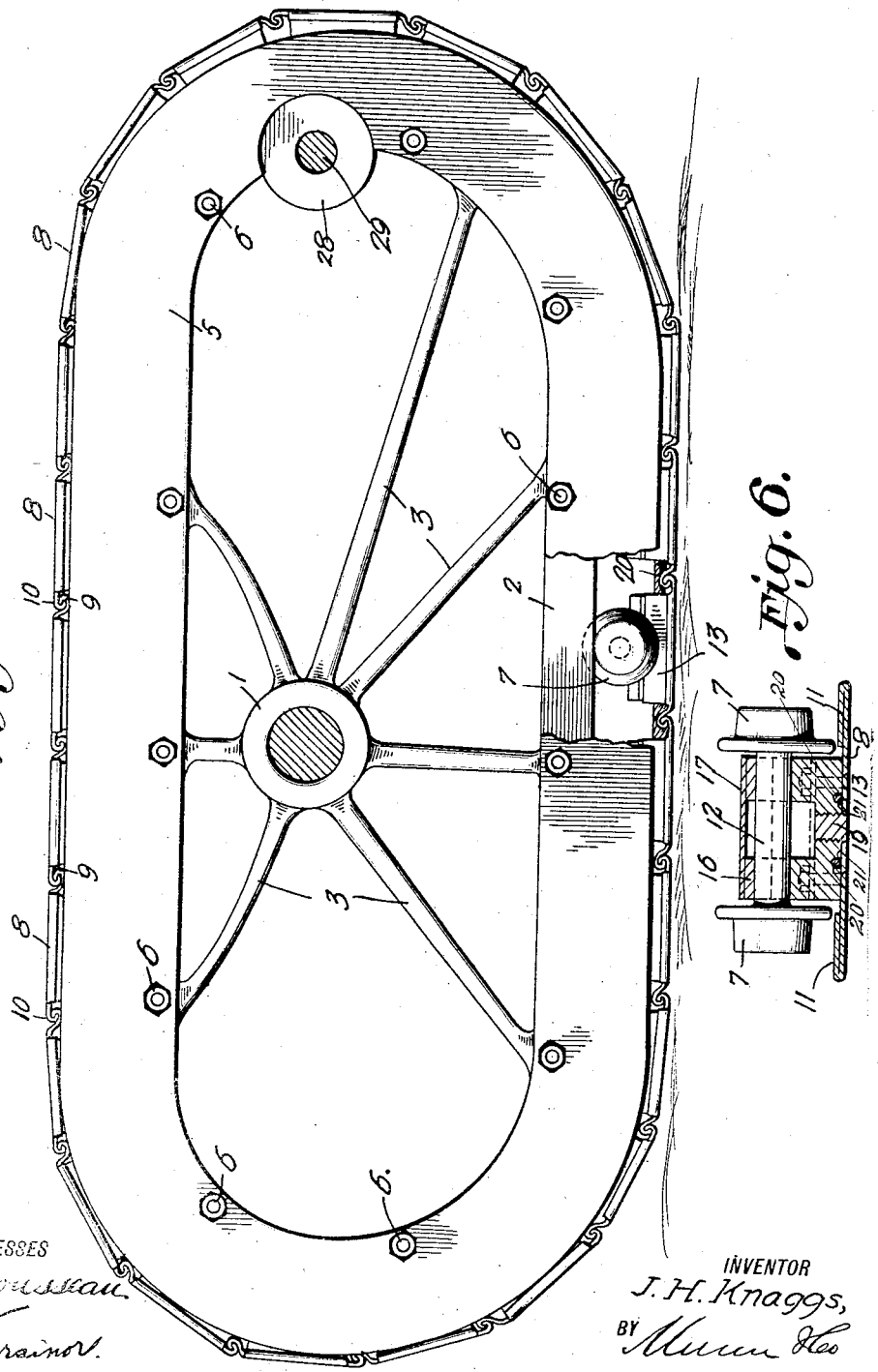
WITNESSES
INVENTOR
J. H. Knaggs,
BY
ATTORNEYS

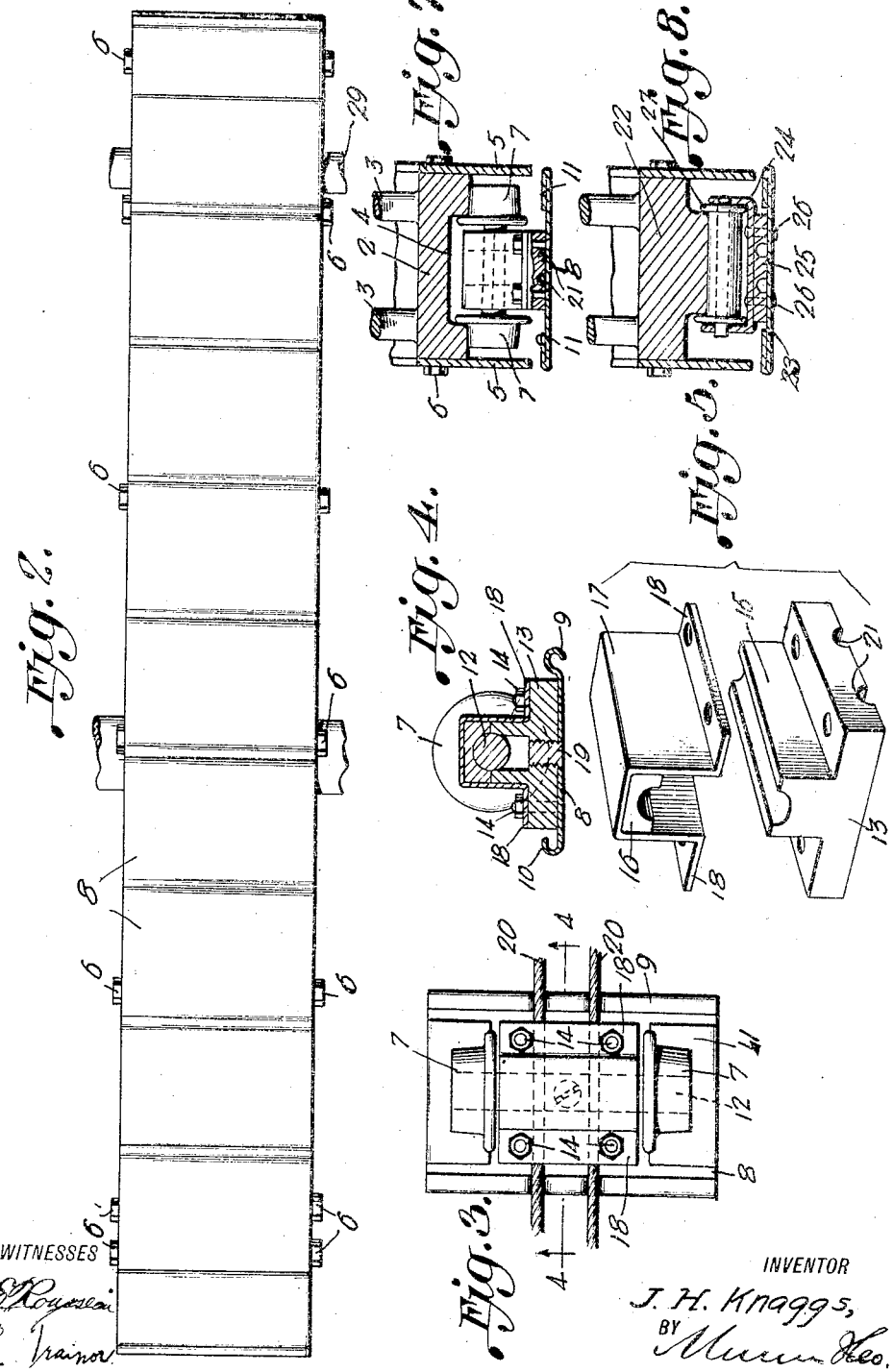

UNITED STATES PATENT OFFICE.

JOHN HAMILTON KNAGGS, OF COEUR D'ALENE, IDAHO.

ENDLESS-RUNNER WHEEL.

1,367,820.

Specification of Letters Patent.   Patented Feb. 8, 1921.

Application filed October 20, 1919.   Serial No. 331,857.

*To all whom it may concern:*

Be it known that I, JOHN HAMILTON KNAGGS, a citizen of the United States, and a resident of Coeur d'Alene, in the county of Kootenai and State of Idaho, have invented certain new and useful Improvements in Endless-Runner Wheels, of which the following is a specification.

My invention is an improvement in endless runner wheels, and has for its object to provide a wheel of the character specified, wherein a supporting frame is provided having tracks or runways upon which the endless runner tread is mounted to move.

In the drawings:

Figure 1 is a side view of the improved wheel,

Fig. 2 is a plan view,

Fig. 3 is a view of one of the tread plates looking from the inner side,

Fig. 4 is a section on the line 4—4 of Fig. 3,

Fig. 5 is a perspective view showing the connector between the wheel shaft and the tread plate with the parts detached, Fig. 6 is a section through the tread at one of the axles, Fig. 7 is a section through the tread and rim of the support, Fig. 8 is a similar view showing a modified form of wheel or roller.

In the present embodiment of the invention a suitable frame is provided, comprising in the present instance a hub portion 1, a rim portion 2 of oblong or oval shape peripherally and spokes 3 connecting the hub and rim portions. The external face of the rim portion 2, is channeled circumferentially of the wheel as shown at 4, and retaining rings 5 are connected to the opposite sides of the rim by means of bolts and nuts 6, which pass through the rim portion of the support.

The channeling of the peripheral face of the support provides a raised rail or track at each side of the channel and at each face of the support, upon which a flange wheel 7 mounted on the tread to be described runs.

The tread comprises a series of similar plates 8 of suitable size and material, and each of these plates is provided at each side edge with hooked flanges 9 and 10. The hook 10 has its bill on the upper face of the plate, while the hook 9 has its bill on the lower face, and the said hook 9 is offset upwardly so that the bill is in the plane of the lower face of the plate. The tread is formed from a series of these plates linked together by engaging the flange 10 of each plate with the flange 9 of the preceding plate, and referring to Figs. 3 and 6 it will be seen that each plate is reinforced by bending the extended ends over upon the body of the plate as shown at 11.

Each tread plate carries two flanged wheels 7, which are secured to the ends of a shaft or axle 12 journaled on the plate, and connected thereto by the connector shown in Fig. 5. The connector comprises a base block 13 which is secured to the tread plate by bolts and nuts 14, the heads of the bolts being countersunk in the tread plate, and the block carries a bearing section 15 at its center extending transversely of the tread plate. The other section 16 of the bearing is carried by a substantially U-shaped keeper 17 which has outwardly extending flanges 18 at its opposite sides. The keeper 17 fits over the bearing section 15, and the flanges 18 rest upon the upper face of the block 13 at opposite sides of the bearing, and are engaged by the bolts 14 before mentioned. The block 13 and the tread plate 8 have registering openings for receiving a screw 19, the said screw being at the center of the block and of the tread plate, and the head of the screw is countersunk in the tread plate.

In addition to the hooked connection of the tread plates, they are connected by flexible members 20, as for instance wire rope, two endless rope belts being provided. The belts are clamped between the blocks 13 and the tread plates, the blocks having transverse grooves 21 for receiving the belts. Referring to Figs. 4 and 6, it will be seen that each of the bearing sections 15 is recessed intermediate its ends at the shaft or axle 12 to receive a lubricant, and the plug 19 provides a means for inserting the lubricant into the recess.

In Fig. 8 there is shown a modified construction, wherein the peripheral face of the rim portion 22 of the support is rabbeted at each face to provide a central rail. The tread plates 23 corresponding to the plates 8 of Fig. 7 have secured thereto U-shaped bearing clips 24, spacing blocks 25 being interposed between the clips and the tread plates. The clips, spacing blocks and tread plates are connected by bolts or rivets 26, and each block 25 is grooved on its underface to engage an endless belt rope. Between the arms of each clip there is journaled a roller 27 having flanges at its ends. This roller runs upon the rail, and the flanges are spaced apart sufficiently to receive the rail between them. The retaining rings 5 may be removed, to permit access to the tread plates, the wheels and the like. All of the tread plates are connected in a flexible chain, and when the wheel is used as a tractor, a bearing 28 is provided at one end of the support, in which is journaled the drive shaft 29 driven by the motor. The drive shaft has connection in any suitable or desired manner with the tread to drive the same.

I claim:

1. A tread belt for endless runner wheels comprising a series of linked plates, flexible members on the inner faces of the plates, bearings secured to the plates and clamping the flexible members between said bearings and the plates, and axles provided at their ends with flanged wheels journaled in the bearings.

2. A tread belt for endless runner wheels comprising a series of linked plates, flexible members on the inner faces of the plates, axles having wheels at their ends journaled on the plates, and bearings for the axles detachably connected with the plates and clamping the flexible members to the plates.

JOHN HAMILTON KNAGGS.